(12) United States Patent  (10) Patent No.: US 10,145,969 B2
Moncho et al.  (45) Date of Patent: Dec. 4, 2018

(54) PROBE FOR GENERATING SEISMIC WAVES

(71) Applicant: ENE29 S.ar.l., Luxembourg (LU)

(72) Inventors: Salvador Moncho, Malakoff (FR);
Nicolas Innocenti, Toulouse (FR);
Laurent Feriol, Lauzerville (FR);
Michael Delchambre, Toulouse (FR)

(73) Assignee: ENE29 S.A.R.L., Luxembourg (LU)

( * ) Notice: Subject to any disclaimer, the term of this patent is extended or adjusted under 35 U.S.C. 154(b) by 226 days.

(21) Appl. No.: 15/306,256

(22) PCT Filed: Apr. 24, 2015

(86) PCT No.: PCT/EP2015/058961
§ 371 (c)(1),
(2) Date: Oct. 24, 2016

(87) PCT Pub. No.: WO2015/162266
PCT Pub. Date: Oct. 29, 2015

(65) Prior Publication Data
US 2017/0045633 A1 Feb. 16, 2017

(30) Foreign Application Priority Data

Apr. 25, 2014 (FR) .................................... 14 53770

(51) Int. Cl.
*E21B 28/00* (2006.01)
*G01V 1/157* (2006.01)
(Continued)

(52) U.S. Cl.
CPC .............. *G01V 1/157* (2013.01); *E21B 28/00* (2013.01); *E21B 43/003* (2013.01); *E21B 49/00* (2013.01)

(58) Field of Classification Search
None
See application file for complete search history.

(56) References Cited

U.S. PATENT DOCUMENTS 4,169,503 A * 10/1979 Scott ..................... E21B 17/003
166/177.1
4,345,650 A 8/1982 Wesley
(Continued)

OTHER PUBLICATIONS

International Search Report, dated Jul. 31, 2015, from corresponding PCT Application.

*Primary Examiner* — Hovhannes Baghdasaryan
(74) *Attorney, Agent, or Firm* — Young & Thompson

(57) ABSTRACT

A probe for generating seismic waves, includes at least:
a tubular body (10) having a first end linked to an electrical power cable,
a capacitor bank arranged within the body,
a spark gap installed at a second end of the body and linked to the capacitor bank, suitable for generating a seismic wave upon the release of the energy stored by the capacitor bank, wherein: the capacitor bank is formed from cylindrical capacitors (621) including bases each having a different polarity, the capacitors are mounted coaxially to each other, parallel to the main axis of the body, and the capacitors are electrically linked into at least two groups of capacitors connected in parallel, each group of capacitors having a positive pole and a negative pole, the groups being arranged in the body such that the facing poles of two adjacent groups are of the same polarity.

20 Claims, 2 Drawing Sheets

Figure 1:
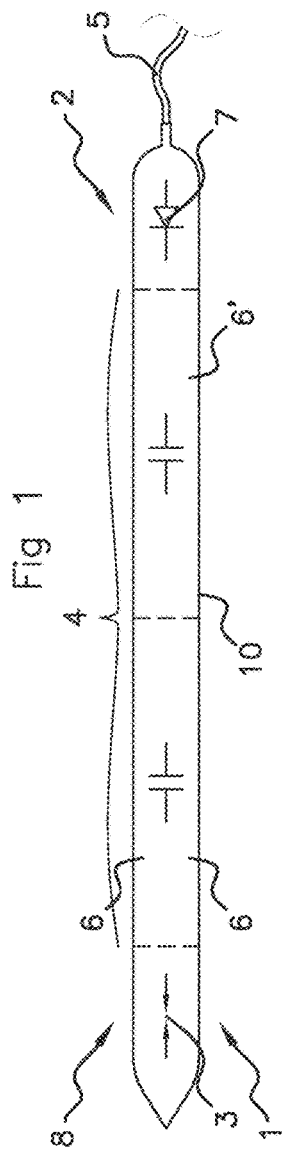

(51) Int. Cl.
*E21B 43/00* (2006.01)
*E21B 49/00* (2006.01)

(56) References Cited

U.S. PATENT DOCUMENTS

| | | | | |
|---|---|---|---|---|
| 5,301,169 A | * | 4/1994 | Baria | G01V 1/157 |
| | | | | 181/106 |
| 2009/0294121 A1 | * | 12/2009 | Leon | E21B 43/26 |
| | | | | 166/248 |
| 2012/0043075 A1 | | 2/2012 | Abramova et al. | |

* cited by examiner

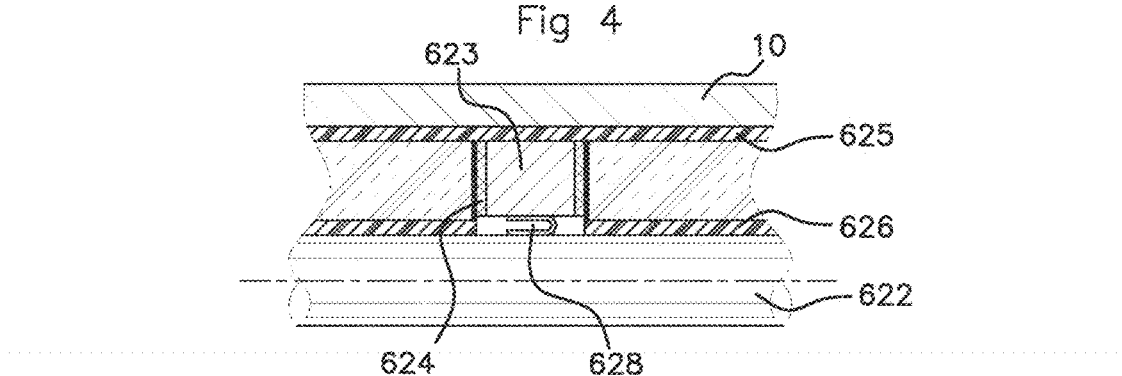
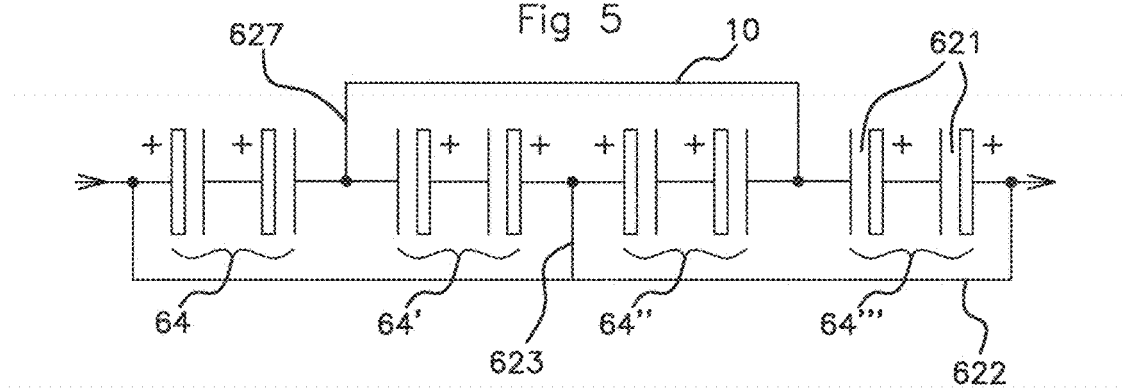
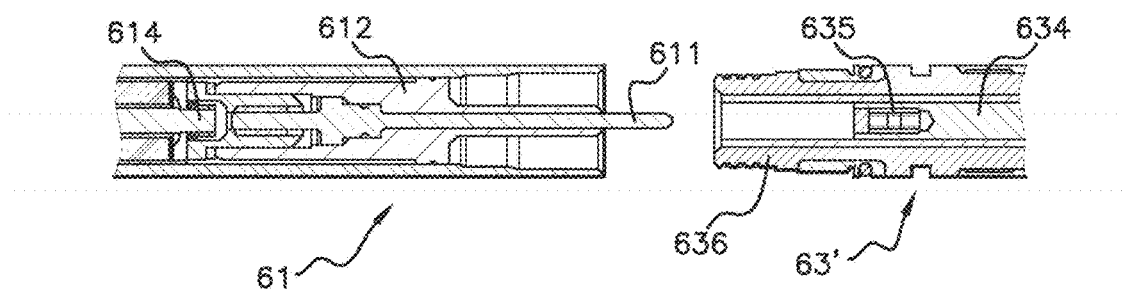
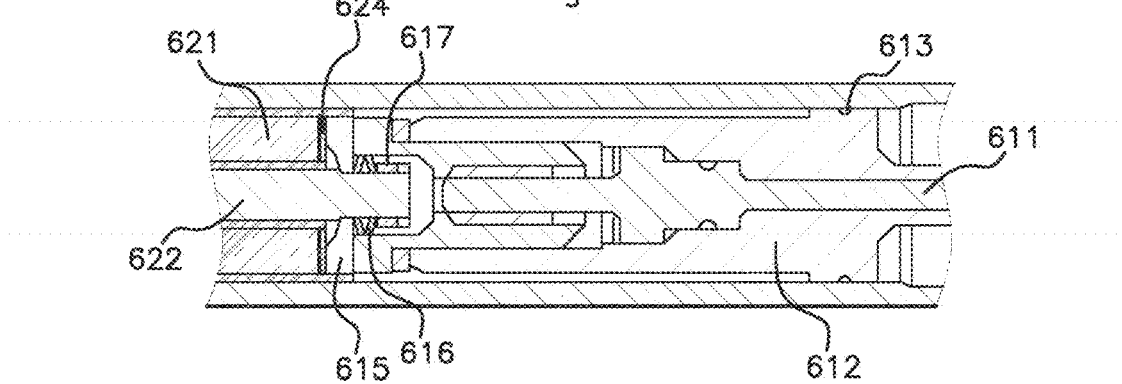

PROBE FOR GENERATING SEISMIC WAVES

The invention relates to a probe for generating seismic waves and more particularly such a probe using a high-power spark gap supplied with power by capacitor banks in order to generate such seismic waves. The invention likewise relates to an arrangement of the capacitor banks in such a probe.

In exploration like in oil drilling, geological operations or mining, it is conventional to use waves which are sent down a wellbore to a predetermined depth and which are used to emit, into the rock, shock waves or pressure waves, more generally referred to as seismic waves, which propagate into the rock, either to detect—by reflection or refraction—breaks in continuity in the surface of the rock (in exploration) or to dislodge a resource (gas or oil) and to allow it to be extracted (in drilling).

There is known, for example from documents U.S. Pat. No. 4,345,650 or US 2012/0043075, such a probe generating seismic waves using a high-power electric arc. Such a probe is generally in the form of an elongate tubular body, having a diameter in the order of 10 to 30 cm and a length which can be about 10 meters, or even more. A first end of the body of the probe is linked to a cable which has a dual function: on the one hand the mechanical connection between the probe and a surface winching system to be able to lower and raise the probe within the wellbore, and on the other hand supplying the probe with electrical power from an electric generator which is also placed on the surface.

The electrical power cable is connected to an electric and electronic module contained in a first part of the body next to this first end and comprising for example means for controlling and supplying a capacitor bank storing energy provided under high-voltage. This capacitor bank takes up the central part of the body of the probe and is connected to a spark gap placed at the end of the body opposite the cable.

When the capacitor bank is discharged through the spark gap, a high-power electric arc is generated and vaporises a fluid, generally water, surrounding the electrodes of the spark gap. This instantaneous vaporisation, of a quasi-explosive type, generates "seismic" shock and/or pressure waves which are diffused around the spark gap through the liquid filling the wellbore and into the neighbouring rock.

In order to obtain an improved range for the thus generated seismic waves, as well as improved efficiency, the essential limiting factor is the energy stored in the capacitor bank and discharged in the spark gap. However, in the known probes, the arrangement of the capacitors has numerous disadvantages: the connection thereof is complex and the installation thereof in the body of the probe is not optimum. Furthermore, the risks of short-circuits or unwanted arcs between the neighbouring capacitor terminals or with the metallic elements of the probe are not negligible and increase as the stored energy increases because the voltages are likely to reach several tens of kilovolts.

The invention thus aims to propose a probe for generating seismic waves allowing improved efficiency both in the quantity of stored energy for a given volume and also in the ease of assembling the probe.

The invention likewise relates to such a probe having improved safety with respect to inappropriate short-circuits.

The invention also relates to such a probe whose diameter is optimised with respect to the amount of energy available in the capacitor bank.

The invention further relates to such a probe which can be used at great depths, for example a depth of several kilometers, without any deterioration owing to temperature or pressure.

The invention furthermore relates to the provision of such a probe which can be transported easily.

The invention still further relates to such a probe whose capacitor bank can be easily adapted to variable power requirements based on usage.

To this end, the invention relates to a probe for generating seismic waves, comprising at least:
  a tubular body which is elongate in a main axis and has a first end linked to an electrical power cable,
  a capacitor bank arranged inside the body and suitable for storing an amount of electrical energy and for releasing this energy in accordance with a discharge pattern,
  a spark gap installed at a second end of the body opposite the first end and linked to the capacitor bank, suitable for generating a seismic wave under the effect of the release of the energy stored by the capacitor bank,
characterised in that:
  the capacitor bank comprises a conductive rod, named a central electrode, formed from at least one rod segment and extending coaxially to the main axis of the body along the capacitor bank,
  the capacitor bank is formed from cylindrical capacitors comprising bases each having a different polarity,
  the capacitors have an axial recess and are mounted coaxially to each other about the central electrode, parallel to the main axis of the body, and
  the capacitors are electrically linked into at least two groups of capacitors connected in parallel, each group of capacitors comprising at least one capacitor and having a positive pole and a negative pole, said groups being arranged in the body such that the facing poles of two adjacent groups are of the same polarity.

In order to increase the total capacity of the capacitor bank, several groups of capacitors are assembled in parallel so as to multiply the capacity of one group by the number of groups. However, when the groups of capacitors are arranged in a row in the body of the probe, there is a high risk of short-circuits or electric arcs between the negative pole of one group and the positive pole of the following group if these are next to each other. In order to limit these risks, provision is made in accordance with the invention to arrange the groups of capacitors head-to-tail by placing the poles of the same polarity of two adjacent groups in contact with each other. The compactness of the capacitor bank can thus be further increased since it is no longer necessary to provide an insulation spacing between two groups of capacitors. The central electrode thus allows a complementary electric pole of the body of the probe to be placed over the entire length thereof. To this end, the central electrode can be divided into several segments connected end-to-end. The capacitors used are formed by a winding of two conductive sheets forming electrodes, separated by a sheet of dielectric material. The sheets are wound around a hollow tubular mandrel and each conductive sheet is linked respectively to one of the bases of the thus formed cylinder. The central electrode thus allows the capacitors to be aligned mechanically.

Advantageously and in accordance with the invention, the capacitors of the same group are connected in series. Owing to the use of cylindrical capacitors whose electrodes are connected to the bases, it is possible to form the capacitor bank in a compact manner, by stacking the capacitors, the negative base of one in contact with the positive base of the next, to thereby form a series assembly. In this manner, the voltage withstand capability of one group of thus assembled identical capacitors is equal to the product of the voltage withstand capability of a capacitor by the number of capacitors in the group.

Advantageously and in accordance with the invention, the facing positive poles of adjacent groups of capacitors are electrically linked to each other and to the central electrode by a contact ring, named a positive ring. The positive poles of two groups of adjacent capacitors are linked to each other by a conductive ring comprising a central contact shoe or blade suitable for establishing an electrical connection with the central electrode. The central electrode thus represents the positive pole of the capacitor bank, a pole which can be reached from any location along the capacitor bank.

Advantageously and in accordance with the invention, the axial recess of the capacitors is insulated from the central electrode by a discontinuous insulating sheath facing the positive ring. Therefore, a continuous insulating sheath covers the wall of the axial recess of the capacitors and extends from a positive pole of one group to the positive pole of another group adjacent by its negative pole so as to insulate the capacitors and the negative ring of the central electrode with the exception of the respective positive poles of these two groups which are connected to the central electrode via their respective positive ring. In accordance with one variant, each capacitor has an insulating tubular axial mandrel and the negative rings linking two adjacent groups are also insulated from the central electrode by an insulating socket. In this variant, the electrical insulation is effected by individually insulating each element.

Advantageously and in accordance with the invention, the facing negative poles of adjacent groups of capacitors are linked to each other and to an inner conductive wall of the tubular body by a contact ring, named a negative ring, suitable for sliding within said wall. In a similar manner to the positive poles, the negative poles of the adjacent groups of capacitors are linked to each other by a conductive ring comprising a peripheral contact blade or shoe suitable for effecting an electrical contact with the inner face of the body of the probe if this body is metallic (conductive) or if need be on a plated conductive surface on the inner wall of the body if this body is insulating. The inner conductive wall of the body of the probe thus forms the second pole of the capacitor bank which can also be accessed from each end of each section forming the capacitor bank. The sliding assembly of the negative rings within the tubular body of the probe allows the capacitors to be arranged around the central electrode and then for the entire arrangement to be engaged in the tubular body, thus avoiding the need for a radial opening therein. Therefore, by using a positive central electrode and a negative electrode formed by the body of the probe, the sizing factor of the diameter of the probe is the diameter of the capacitors which allows the diameter of the probe to be reduced compared with known probes.

Advantageously and in accordance with the invention, the capacitors are arranged within a discontinuous insulating sleeve facing the negative ring. Therefore, a continuous insulating sleeve covers the outer radial wall of the capacitors of two groups adjacent by their positive pole, as well as that of the positive ring so as to be able to install the capacitors in the tubular body of the probe when the body is conductive, by substantially taking up all the hollow space of the body without thereby creating a short-circuit between the outer radial wall of the capacitor and the body of the probe. In one variant, the outer radial wall of each capacitor is covered by an individual insulating sleeve, similarly for the outer wall of the positive ring, thus ensuring the electrical insulation with respect to the body individually for each element.

Advantageously and in accordance with the invention, the body of the probe comprises a plurality of nestable sections and the capacitor bank is formed of at least one section comprising at least two groups of capacitors. When it is necessary for the probe to have a high power, the capacitor bank may comprise numerous groups of capacitors, representing a non-negligible length. In practice, such probes can reach a length of 10 to 20 meters and have a considerable weight which is likely to pose problems in terms of transport and handling. To this end, provision is made in accordance with the invention to divide the probe into multiple sections, comprising for example a first section housing the load and control electronic elements of the capacitor bank, an end section at the opposite end of the probe, comprising the spark gap, and at least one intermediate section receiving all or part of the capacitor bank. Other than the advantage of limiting the weight and size of each section, this arrangement allows one or more intermediate sections to be added to increase the power of the capacitor bank housed in the probe.

Advantageously and in accordance with the invention, each end of a section of the probe comprises electrical connection means linked respectively to the central electrode and to the tubular body, suitable for cooperating with conjugated means placed at an opposite end of the adjacent section. Each section of the capacitor bank thus has a central plug linked to one end of the central electrode and suitable for cooperating with an opposite socket-shaped end of the central electrode of the adjacent section. Therefore, by simply nesting two sections forming part of the capacitor bank, the electrical connection of the central electrode is formed between the two sections. This is also true for the second pole of the capacitor bank which is connected between the two sections by nesting the tubular body of one section in that of the adjacent section.

Advantageously and in accordance with the invention, each section has means for compensating for the elongation of the capacitors of the section. A probe in accordance with the invention is likely to be lowered into a wellbore to depths of several kilometers. Due to this, the operating temperature of each section of the probe can vary between an ambient temperature prevailing at the surface (±30° C. for example) and temperatures in the order of 160° C. at the base of the well. The different elements of the probe, in particular the tubular body, the central electrode and the capacitors may thus expand and have different coefficients of elongation. In order to prevent the capacitor bases from moving apart from each other and creating false contacts under the effect of a greater expansion of the central electrode, compensation means are provided to always exert an axial force for positively clamping the capacitors to each other.

Advantageously and in accordance with the invention, said elongation compensation means comprise an elastic device fixed on one end of the central electrode and exerting an axial compression force on the capacitors of the section. The capacitors of the same section, as well as their contact and connection rings, are mounted in a sliding manner on the central electrode, and clamped to each other at at least one of the ends of this central electrode by a spring, e.g. in the form of conical washers fixed by a nut to the central electrode.

Advantageously and in accordance with the invention, each section is filled with an insulating fluid and has means for compensating for the expansion of said insulating fluid.

In order to increase the dielectric rigidity of the entire capacitor bank, each section is filled with an insulating fluid, e.g. a mineral oil with a high dielectric constant also used for impregnation of the capacitors. Each section of the probe is filled with pressurised oil and must be sealed so as not to adversely affect probe assembly operations. Each section thus comprises means for pressurisation and compensation for thermal expansions of the thus housed oil.

Advantageously and in accordance with the invention, said expansion compensation means comprise a variable volume pressurised chamber. Therefore, each section includes a hollow cylinder separated into two by a movable piston, a first chamber—named a pressurised chamber—being in fluid communication with the insulating fluid and a second chamber filled with a pressurised gas, thus allowing expansion of the insulating fluid.

The invention also relates to a probe for generating seismic waves, characterised in combination by all or some of the features mentioned above or hereinafter.

Figure 2:
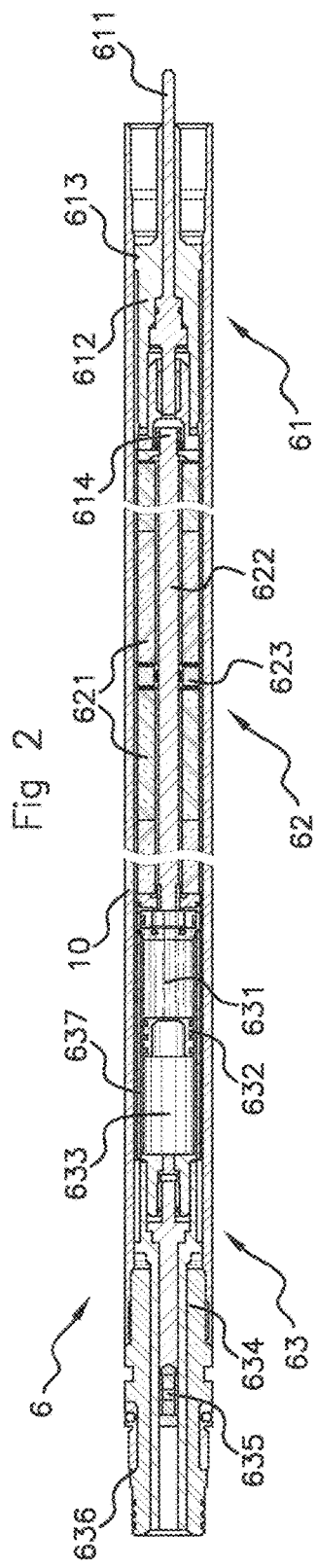
Figure 3:
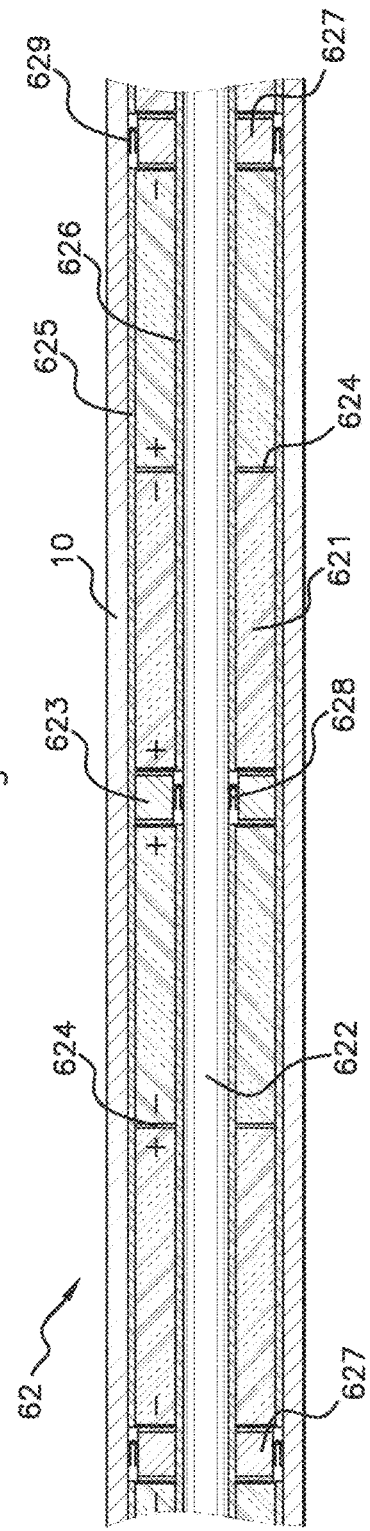

Other aims, features and advantages of the invention will become apparent in view of the following description and accompanying drawings, in which:

FIG. 1 shows a diagram of a probe in accordance with the invention,

FIG. 2 is a cross-sectional view of a section forming part of a capacitor bank provided on a probe in accordance with the invention, FIG. 3 is a detailed cross-sectional view of an arrangement of two groups of capacitors forming part of the capacitor bank, FIG. 4 is a detailed cross-sectional view of the connection of two positive poles of two adjacent groups of capacitors, FIG. 5 is a wiring diagram showing an example of the electric arrangement of a section of the probe in accordance with the invention, FIG. 6 is a cross-sectional view of the means for assembling two sections of a probe in accordance with the invention, and FIG. 7 is a detailed view of means for clamping and compensating for the elongation of the capacitors of a section of the probe in accordance with the invention.

In the following description, identical elements are designated by the same reference, except when it is necessary to distinguish between them for reasons of clarity. In that case, the reference thereof is followed with a prime symbol ('), double prime symbol (") etc.

FIG. 1 schematically shows a probe 1 for generating seismic waves which is in the form of an elongate tubular body 10 having at a first end 2 a section containing, for example, electrical and electronic elements 7 such as a step-up transformer, rectifiers, controllers, etc.), this first end 2 being linked to a cable 5 allowing on the one hand the probe to be supplied with electrical power, for example with alternating current at a voltage compatible with the withstand capability of the cable and its length and ensuring on the other hand the mechanical connection of the probe with a winch allowing the probe to be moved into a wellbore. The probe 1 comprises at a second end of the body 10 opposite the cable 5 a final section 8 comprising a spark gap 3 allowing one (or more) electric arc(s) to be formed in a liquid medium so as to vaporise same in a very short amount of time to generate a pressure wave or shock wave capable of propagating into the neighbouring rock. The spark gap 3 can be placed in a cavity of the body 10 open towards the outside and can use water filling the wellbore or even be placed in a part insulated from the outer environment by a flexible wall allowing the transmission of shock waves and can lie in a suitable liquid. The spark gap 3 is electrically linked, directly or via a switching device, to a source of high-power energy formed by a capacitor bank 4 placed in the middle part of the body 10. The bank 4 comprises one or more sections 6, 6' nested one within another and each containing a capacitor arrangement able to store the electrical energy from the cable 5 and to release it to the spark gap 3.

Reference is now made to FIG. 2 which shows a longitudinal cross-section of a section 6 forming part of the capacitor bank 4. The section 6 comprises three parts:
- a front part 61 which comprises connection means (connection pin 611) with the rear part 63' of an adjacent section 6' and means 614 for compensating for the elongation of the capacitors housed in the intermediate part 62 of the section 6;
- an intermediate part 62 which will be described in more detail hereinafter in relation to FIGS. 3 to 5 and which comprises capacitors 621, a central electrode 622 and connection rings 623 (and 627 in FIG. 3); and
- a rear part 63 which comprises an expansion vessel 637 to compensate for the expansion of an insulating fluid surrounding all of the section 6, a cap 636 suitable for nesting in the front part 61 of an adjacent section (FIG. 6) comprising a connection socket 635 cooperating with the connection pin 611.

The intermediate part 62 houses capacitors 621 which are arranged in groups 64 (FIG. 5) of capacitors, the capacitors of the same group being mounted in series and the groups being linked in parallel with each other. FIG. 5 shows a wiring diagram of an example of an arrangement of capacitors comprising four groups 64, 64', 64" and 64'" of two capacitors 621 linked by the positive poles of each group to a conductor of positive polarity represented by the central electrode 622 and by the negative poles of these groups to a conductor of negative polarity represented by the body 10. Such an arrangement allows a capacitor bank or bank element to be obtained having a maximum operating voltage double that of an individual capacitor and a capacity four times that of an individual capacitor, whilst avoiding the positive and negative poles of different groups of capacitors being too close together.

Such an arrangement is partially shown, from a mechanical point of view, in FIG. 3 which shows two groups of two capacitors corresponding to the groups 64' and 64" in FIG. 5. Each capacitor 621 is cylindrical in shape having a central recess along its axis. Such capacitors are generally formed by winding two metallic films separated by a dielectric film around a central hollow mandrel. Each metallic film is electrically linked respectively to one or the other of the two bases of the cylinder formed by the winding, each base being metallised and thereby forming an electrode with a polarity opposite to that of the other base. Advantageously, the capacitor has an outer diameter enabling it to be inserted in the inner diameter of the tubular body 10.

The capacitors 621 are installed coaxially in the intermediate part 62 of the section 6 around a metallic conductive rod, for example a brass rod with a diameter of 15 to 25 mm, forming a central electrode 622.

Within the same group, the opposite poles of two adjacent capacitors are contacted by a contact washer 624, e.g. of expanded metal. The groups of capacitors are installed on the central electrode 622 such that the positive poles of two adjacent groups are connected to each other by a metallic ring, named a positive ring 623, if need be via contact washers 624 on each side of the positive ring, as shown in the detailed view in FIG. 4. The positive ring 623 is in contact with the central electrode 622 via a conductive tab 628 forming a contact shoe with the surface of the central electrode.

In a similar manner, the negative poles of two adjacent groups are connected to each other by a metallic ring, named a negative ring 627, which has a conductive tab 629 on its outer radial envelope so as to ensure a sliding electrical contact with the inner metallic face of the body 10 which thereby fulfils a function of a negative electrode.

The capacitors 621, contact rings 624 and negative ring 627, which form two groups adjacent by their negative pole, are insulated from the central electrode 622 by an insulating sheath 626. The insulating sheath 626 thus extends continuously between two consecutive positive rings 623 and is discontinuous only facing these positive rings to enable the contact thereof with the central electrode.

Similarly, the capacitors 621, contact rings 624 and positive ring 623, which form two groups adjacent by their positive pole, are insulated from the body 10 by an insulating sleeve 625 which extends continuously between two consecutive negative rings 627 and is discontinuous only facing said rings to enable the electrical contact with the metallic surface of the interior of the body 10.

Alternatively or in combination, the capacitors 621 can comprise an insulating mandrel and the negative ring 627 also has an insulating inner radial envelope facing the central electrode 622 so as to ensure an electrical insulation element by element. Similarly, the outer radial envelope of the capacitors 621 and of the positive ring 623 can be covered individually by an insulating layer.

Owing to this assembly, the capacitors 621 are arranged coaxially to the central electrode 622 and fixed thereto. This assembly can thus be slid into the intermediate part 62 of the tubular body 10 of the section 6, the negative rings 627 forming, via their conductive tab 629, the electrical contact with the tubular body 10.

However, it should be noted that, owing to the high variations in temperature to which such a probe may be subjected, for example from a surface temperature which can reach −30° C. for a well in cold regions (the Arctic, Siberia, etc.) to a temperature in the order of 160° at several kilometers of depth, it is necessary to provide means for compensating for the elongation of all the capacitors and rings mounted on the central electrode. In fact, this is likely to expand under the effect of temperature with an elongation greater than that of the capacitors, thereby risking a degradation or even rupture of the contact between the bases of the capacitors. Therefore, elongation compensation means 614 are provided at the junction between the intermediate part 62 and the front part 61 of the section. These elongation compensation means 614 are described in relation to FIG. 7. They comprise a pressure washer 615 engaged with the central electrode 622 in contact with the positive base of the final capacitor 621 via, if need be, a contact washer 624. An elastic device formed, for example, by two conical washers 616 clamped by a nut 617 screwed to the central electrode exerts a compression force on the pressure washer 615 and thereafter on all the capacitors mounted on the central electrode.

The front part 61 of the section 6 likewise comprises a conductive plug 611 linked to the central electrode 622. This plug 611 is coated with an insulating bushing 612 allowing it to be centred with respect to the body of the section and to insulate it from the negative electrode. The bushing 612 comprises, at least in part, an outer diameter corresponding to the inner diameter of the body 10 and sealing means, for example an O-ring 613, housed at the end of the bushing so as to form the inner sealing of the section when this is filled with insulating fluid as described hereinafter.

FIG. 6 shows the assembly means between the front part 61 of a first section and the rear part 63' of two adjacent sections 6 and 6'. The plug 611 engages into the cap 636 of the rear part 63' and comes to contact a socket 635 having a diameter suitable for achieving the electric continuity between the central electrode 622 of the first section and a conductive rod 634 itself being electrically connected to the central electrode 622 of the second section. Similarly, the outer part of the cap 636 comes to be engaged in the annular space between the plug 611 and the end of the tubular body 10 of the bushing so as to form an electrical contact ensuring the electric continuity between the tubular bodies of the two sections.

Referring again to FIG. 2, the features of the rear part 63 of the section 6 will now be discussed in detail. In order to improve the dielectric rigidity of the capacitor bank, it is common to surround the capacitors with an insulating fluid such as a mineral oil allowing the insulation between elements of different polarity to be improved. However, this insulating fluid, subjected to the variations in temperature described above, expands and generates internal pressures in each section which are likely to damage the components of the section, e.g. the insulating sleeves, the wall of the section, the end bushings and even the capacitor bank. The rear part 63 thus comprises means for compensating for the expansion of the fluid in the form of a cylindrical expansion vessel 637 having a pressurisation chamber 631 in communication with the insulating fluid and filled with this fluid, a piston 632 separating the pressurisation chamber 631 from a second chamber 633 filled with pressurised gas. Therefore, the variations in volume of the insulating fluid can be absorbed by the variation in position of the piston 632 whilst retaining a minimum pressure corresponding to the pressure of the gas in the chamber 633.

The body of the expansion vessel 637 is made of a conductive material, linked on the one hand by its end corresponding to the chamber 631 to the central electrode 622 and on the other hand by its end corresponding to the chamber 633 to the conductive rod 634 to which the socket 635 is connected. The electric continuity between the socket 635 (and thus the plug 611 of the previous section) and the central electrode 622 is thus ensured. The body of the expansion vessel 637 is also coated with an insulating layer allowing the tubular body 10, which forms the negative electrode, to be insulated.

There is thus described a probe for generating seismic waves in which a capacitor bank is arranged coaxially and whose poles are formed by a positive central electrode surrounded by a tubular body of negative polarity. Owing to the particular arrangement of the capacitors into groups of capacitors mounted head-to-tail, the poles of different polarity are not placed next to each other and the risks of short-circuits are minimised.

Of course, arrangements other than that described above in relation to FIG. 5 (four groups of two capacitors) may be envisaged based on the sought-after electrical characteristics, e.g. two groups of three capacitors in series or six groups in parallel each comprising a single capacitor.

Similarly, this description is given merely by way of illustrative example and the person skilled in the art could make numerous modifications thereto without departing from the scope of the invention, such as for example modifying the respective places of the means for compensating for the elongation of the capacitors and the means for compensating for the expansion of the fluid, or even placing both of them on the same side of the intermediate part of the section.

The invention claimed is:

1. Probe (1) for generating seismic waves, comprising at least:
- a tubular body (10) which is elongate in a main axis and has a first end (2) linked to an electrical power cable (5),
- a capacitor bank (4) arranged inside the body (10) and suitable for storing an amount of electrical energy and for releasing this energy in accordance with a discharge pattern,
- a spark gap (3) installed at a second end of the body opposite the first end and linked to the capacitor bank, suitable for generating a seismic wave under the effect of the release of the energy stored by the capacitor bank, wherein:
  - the capacitor bank (4) comprises a conductive rod, named a central electrode (622), formed from at least one rod segment and extending coaxially to the main axis of the body (10) along the capacitor bank,
  - the capacitor bank (4) is formed from cylindrical capacitors (621) comprising bases each having a different polarity,
  - the capacitors (621) have an axial recess and are mounted coaxially to each other about the central electrode (622), parallel to the main axis of the body, and
  - the capacitors (621) are electrically linked into at least two groups (64, 64', 64", 64''') of capacitors connected in parallel, each group of capacitors comprising at least one capacitor and having a positive pole and a negative pole, said groups being arranged in the body (10) such that the facing poles of two adjacent groups are of the same polarity.

2. A probe according to claim 1, wherein the capacitors (621) of the same group (64) are connected in series.

3. A probe according to claim 1, wherein the facing positive poles of adjacent groups (64', 64") of capacitors are electrically linked to each other and to the central electrode (622) by a contact ring, named a positive ring (623).

4. A probe according to claim 3, wherein the axial recess of the capacitors is insulated from the central electrode (622) by a discontinuous insulating sheath (626) facing the positive ring (623).

5. A probe according to claim 1, wherein the facing negative poles of adjacent groups (64, 64') of capacitors are linked to each other and to an inner conductive wall of the tubular body (10) by a contact ring, named a negative ring (627), suitable for sliding within said wall.

6. A probe according to claim 5, wherein the capacitors (621) are arranged within a discontinuous insulating sleeve (625) facing the negative ring (627).

7. A probe according to claim 1, wherein the body (10) of the probe comprises a plurality of nestable sections (6, 6') and in that the capacitor bank (4) is formed of at least one section (6) comprising at least two groups (64', 64") of capacitors (621).

8. A probe according to claim 7, wherein each end of a section (6) of the probe comprises electrical connection means (611, 635) linked respectively to the central electrode (622) and to the tubular body (10), suitable for cooperating with conjugated means placed at an opposite end of the adjacent section.

9. A probe according to claim 7, wherein each section (6) comprises means (614) for compensating for the elongation of the capacitors (621) of the section.

10. A probe according to claim 9, wherein said elongation compensation means (614) comprise an elastic device (616) fixed on one end of the central electrode (622) and exerting an axial compression force on the capacitors (621) of the section.

11. A probe according to claim 7, wherein each section (6) is filled with an insulating fluid and comprises means (637) for compensating for the expansion of said insulating fluid.

12. A probe according to claim 11, wherein said expansion compensation means (637) comprise a variable volume pressurised chamber (631).

13. A probe according to claim 2, wherein the facing positive poles of adjacent groups (64', 64") of capacitors are electrically linked to each other and to the central electrode (622) by a contact ring, named a positive ring (623).

14. A probe according to claim 2, wherein the facing negative poles of adjacent groups (64, 64') of capacitors are linked to each other and to an inner conductive wall of the tubular body (10) by a contact ring, named a negative ring (627), suitable for sliding within said wall.

15. A probe according to claim 3, wherein the facing negative poles of adjacent groups (64, 64') of capacitors are linked to each other and to an inner conductive wall of the tubular body (10) by a contact ring, named a negative ring (627), suitable for sliding within said wall.

16. A probe according to claim 2, wherein the body (10) of the probe comprises a plurality of nestable sections (6, 6') and in that the capacitor bank (4) is formed of at least one section (6) comprising at least two groups (64', 64") of capacitors (621).

17. A probe according to claim 8, wherein each section (6) comprises means (614) for compensating for the elongation of the capacitors (621) of the section.

18. A probe according to claim 8, wherein each section (6) is filled with an insulating fluid and comprises means (637) for compensating for the expansion of said insulating fluid.

19. A probe according to claim 9, wherein each section (6) is filled with an insulating fluid and comprises means (637) for compensating for the expansion of said insulating fluid.

20. A probe according to claim 10, wherein each section (6) is filled with an insulating fluid and comprises means (637) for compensating for the expansion of said insulating fluid.

* * * * *